(12) United States Patent
Tomaru et al.

(10) Patent No.: US 7,444,900 B2
(45) Date of Patent: Nov. 4, 2008

(54) ELECTRICALLY-DRIVEN STEERING COLUMN APPARATUS

(75) Inventors: Masaki Tomaru, Gunma-ken (JP); Chie Mitsuhashi, Gunma-ken (JP); Takeshi Fujiwara, Gunma-ken (JP); Yasuhiro Shibuya, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/826,183

(22) Filed: Jul. 12, 2007

(65) Prior Publication Data

US 2007/0262576 A1 Nov. 15, 2007

Related U.S. Application Data

(62) Division of application No. 10/484,499, filed as application No. PCT/JP03/03094 on Mar. 14, 2003, now abandoned.

(30) Foreign Application Priority Data

| Mar. 20, 2002 | (JP) | ............................. 2002-078447 |
| Aug. 29, 2002 | (JP) | ............................. 2002-250301 |
| Jan. 8, 2003 | (JP) | ............................. 2003-002454 |

(51) Int. Cl.
*B62D 1/16* (2006.01)
*B62D 1/18* (2006.01)

(52) U.S. Cl. .......................................... 74/495; 74/493

(58) Field of Classification Search ........... 74/493–495; 280/775
See application file for complete search history.

(56) References Cited

U.S. PATENT DOCUMENTS

| 3,252,350 | A | | 5/1966 | Zeigler ........................ 74/493 |
| 4,602,520 | A | * | 7/1986 | Nishikawa et al. ............ 74/493 |
| 5,112,153 | A | * | 5/1992 | Gunn et al. ..................... 403/7 |
| 5,449,199 | A | * | 9/1995 | Heinrichs et al. ........... 280/775 |
| 5,590,565 | A | | 1/1997 | Palfenier et al. .............. 74/493 |
| 6,343,888 | B1 | | 2/2002 | Huhn et al. .................. 403/133 |
| 6,543,916 | B2 | | 4/2003 | Shirai ......................... 362/460 |
| 2001/0036080 | A1 | | 11/2001 | Shirai ......................... 362/460 |
| 2002/0124677 | A1 | | 9/2002 | Tomaru et al. ................ 74/493 |

FOREIGN PATENT DOCUMENTS

| DE | 36 18 266 | 10/1987 |
| DE | 199 62 494 | 7/2000 |
| JP | UM 63-165269 | 10/1988 |
| JP | UM 1-145768 | 6/1989 |
| JP | UM 2-44566 | 3/1990 |
| JP | UM 5-29979 | 7/1993 |
| JP | UM 6-1503 | 1/1994 |
| JP | 10-181613 | 7/1998 |
| JP | 2000-238647 | 9/2000 |
| JP | 2001-18809 | 1/2001 |

* cited by examiner

*Primary Examiner*—Richard W L Ridley
*Assistant Examiner*—Justin Krause
(74) *Attorney, Agent, or Firm*—Miles & Stockbridge P.C.

(57) ABSTRACT

An electrically-driven steering column apparatus includes a steering column rotatably holding a steering shaft and capable of adjusting a position of the steering wheel, and a power transmission mechanism for transmitting to the steering column a rotational driving force of an electric motor as a position adjusting motion driving force, wherein the power transmission mechanism has a joint constructed of a spherical joint element and a cylindrical joint element in which the spherical joint element is slidably fitted, on within a driving force transmission route.

18 Claims, 20 Drawing Sheets

ELECTRICALLY-DRIVEN STEERING COLUMN APPARATUS

CROSS-REFERENCE TO RELATED APPLICATION

This application is a division of application Ser. No. 10/484,499 filed Jan. 22, 2004 now abandoned, which is a 371 of PCT/JP03/03094 filed Mar. 14, 2003.

TECHNICAL FIELD

The present invention relates generally to an electrically-driven steering column apparatus, and more particularly to a technology scheming to configure the apparatus in a compact size and to reduce a manufacturing costs thereof, and so on.

BACKGROUND ART

A steering apparatus of an automobile is used (steered) by a multiplicity of unspecified drivers, and it is therefore desired that a position of a steering wheel be easily adjusted corresponding to an individual physique, a driving posture, etc. There increases the number of apparatuses adopting an electrically-driven tilt mechanism and an electrically-driven telescopic mechanism in order to meet such a demand.

The electrically-driven tilt type steering column apparatus is an apparatus for adjusting the position of the steering wheel in up-and-down directions. The electrically-driven tilt type steering column apparatus is constructed of a steering shaft, a steering column divided into a swing-side column and a fixed-side column, a tilt pivot about which the swing-side column swings, and a tilt driving means composed of an electric motor, a screw mechanism, etc. (refer to, for example, Japanese Utility Model Post-Exam. Publication No. 6-1503 (pp. 2-3 and FIGS. 1 and 2) and Japanese Patent Application Laid-Open Publication No. 2000-238647 (p. 4 and FIG. 1)). Further, the electrically-driven telescopic type steering column apparatus is constructed of an outer column attached to a car body side, a steering shaft, a lower column supporting the steering shaft and slidably fitted in the outer column, and a telescopic driving means composed of an electric motor, a screw mechanism, etc. (refer to, for example, Japanese Utility Model Laid-Open Publication No. 63-165269 (p. 1 and FIGS. 6 and 7) and Japanese Patent Application Laid-Open Publication No. 13-18809 (p. 3 and FIGS. 1 and 2)).

The tilt driving means and the telescopic driving means have the electric motors defined as power sources, and power transmission means for converting rotational driving forces of the electric motors into a tilt motion driving force for the swing-side column and into a telescopic motion driving force for the inner column. Then, the power transmission means includes, e.g., a worm gear mechanism for decelerating rotations of the electric motor, a feed screw mechanism for converting a rotational driving force into a rectilinear driving force, and so on. The tilt motion driving means further includes a link mechanism for converting the rectilinear driving force into a swing driving force for the swing-side column.

In the electrically-driven tilt type steering column apparatus described above, the link mechanism, etc. explained above becomes large in scale in terms of swinging the swing-side column having a comparatively heavy weight about the tilt pivot as a fulcrum, and therefore the configuration of the whole apparatus has no alternative but to become complicated and large in scale. For instance, the apparatus disclosed in Japanese Utility Mode Post-Exam. Publication No. 6-1503 takes such a structure that the worm wheel (nut member) of the worm gear mechanism is made swingable as an inner race of an angular bearing, and an end of a screw shaft screw-engaged to the worm wheel is connected to a bracket on an undersurface of the swing-side column. Moreover, in the apparatus disclosed in Japanese Patent Application Publication N-2000-238647, the electric motor, the worm gear mechanism and the feed screw mechanism are unitized and thus connected in a swingable manner to the fixed-side column, and a front side end of an actuator rod of the feed screw mechanism is connected to a tilt swing member supported in the swingable manner to the sing-side column.

On the other hand, the electrically-driven telescopic type steering column apparatus has a variety of problems derived from the power transmission means. For instance, in the Japanese Utility Model Laid-Open Publication No. 63-165269, a telescopic motion of an inner column through the screw shaft and a support bracket involves elongating a transmission route for the driving force given from the electric motor, with the result that vibrations and noises are rarely caused because of the screw shaft and the support bracket being flexed. Especially, the screw shaft is not allowed to increase much of a diameter for the reasons of saving a space, a weight and a cost, and hence its strength inevitably decreases. Further, the apparatus disclosed in Japanese Patent Application Laid-Open Publication No. 13-18809 given above has less of such inconveniences, however, on the occasion of engaging the feed screw mechanism as a driving rod with the bracket, if not precisely attached so that the driving rod becomes parallel with the telescopic direction of the inner column, it happens that those components do not move smoothly as an excessive force acts thereon when in the telescopic operation. Therefore, a high accuracy is required of positioning the components such as the bracket defined as the engaging member of the feed mechanism, etc. Note that in the apparatus disclosed in the Japanese Utility Model Laid-Open Publication No. 63-165269, unless the screw shaft is parallel with an upper shaft, there occurs a deviation between the two shafts, and the high accuracy is required of positioning the components such as the support bracket defined as the engaging member of the feed mechanism.

DISCLOSURE OF THE INVENTION

It is an object of the present invention, which was devised under the circumstances described above, to provide an electrically-driven steering column apparatus actualizing a compact configuration, a high rigidity and a reduction in the number of components while scheming to attain a smooth operation.

To accomplish the above object, according to a first aspect of the present invention, an electrically-driven steering column apparatus comprises a steering shaft having its rear end to which a steering wheel is attached, a steering column, for rotatably holding the steering shaft, capable of adjusting a tilt position about a tilt pivot as a fulcrum on the basis of a car-body-side member, an electric motor for a tilt motion of the steering column, and a power transmission mechanism for transmitting to the steering column a rotational driving force of the electric motor as a tilt motion driving force for the steering column, wherein the power transmission mechanism includes a joint constructed of a spherical joint element and a cylindrical joint element in which the spherical joint element is slidably fitted, on within a driving force transmission route from the electric motor to the steering column.

According to the first aspect of the present invention, for instance, the spherical joint element is fixed to or molded integrally with the slider of the feed screw mechanism attached to the steering column. Then, the cylindrical joint element in which this spherical joint element is fitted, can be fixed to or molded integrally with the bracket on the car body side. With this configuration, the slider is driven into the rectilinear motions in the up-and-down directions by the screw mechanism, etc., whereby an upward or downward driving force is transmitted to the cylindrical joint element via the spherical joint element. Then, the spherical joint element rotates and slides within the cylindrical joint element, and the steering column swings, accompanied with such rotations and slides, up and down with respect to the bracket.

Further, according to a second aspect of the present invention, an electrically-driven steering column apparatus comprises a steering shaft having its rear end to which a steering wheel is attached, a steering column, for rotatably holding the steering shaft, capable of adjusting a telescopic position on the basis of a car-body-side member, an electric motor for a telescopic motion of the steering column, and a power transmission mechanism for transmitting to the steering column a rotational driving force of the electric motor as a telescopic motion driving force for the steering column, wherein the power transmission mechanism includes a joint constructed of a spherical joint element and a cylindrical joint element in which the spherical joint element is slidably fitted, on within a driving force transmission route from the electric motor to the steering column.

According to the second aspect of the present invention, for example, the spherical joint element is fixed to or molded integrally with the slider of the feed screw mechanism attached to the car-body-side member. Then, the cylindrical joint element in which this spherical joint element is fitted, can be fixed to or molded integrally with the steering column. With this configuration, the slider is driven into the rectilinear motions in the back-and-forth directions by the screw mechanism, etc., whereby a forward or backward driving force is transmitted to the cylindrical joint element via the spherical joint element. Then, a flexure, etc. of the screw shaft is absorbed as the spherical joint element rotates and slides within the cylindrical joint element, whereby the steering column makes smooth telescopic motions.

Moreover, in the electrically-driven steering column apparatus according to the first and second aspects of the present invention, preferably a synthetic resin member may be interposed between the spherical joint element and the cylindrical joint element.

In the electrically-driven steering column apparatus according to the present invention, preferably the synthetic resin member may be formed as a sleeve fitted in the cylindrical joint element.

Further, in the electrically-driven steering column apparatus according to the present invention, preferably the synthetic resin member may be formed as a slider having a concave spherical surface in which the spherical joint element is fitted.

Thus, in the case of adopting the synthetic resin member, an elasticity of the synthetic resin member makes it difficult to cause a backlash between the spherical joint element and the cylindrical joint element, and, in addition, it is possible to restrain an emission of noises and an occurrence of abrasion due to a metal-to-metal contact.

Moreover, in the electrically-driven steering column apparatus according to the present invention, preferably the power transmission mechanism may include a feed screw mechanism constructed of a feed screw shaft connected to the electric motor and of a plurality of feed nuts screw-engaged to the feed screw shaft, and a backlash adjusting means for changing an axial distance between the feed nuts in order to make a backlash of the feed screw mechanism adjustable.

Further, in the electrically-driven steering column apparatus according to the present invention, the power transmission mechanism may include a feed screw mechanism constructed of a feed screw shaft connected to the electric motor and of a feed nut formed with a slit and screw-engaged to the feed screw shaft, and a backlash adjusting means for changing a width of the slit in order to make a backlash of the feed screw mechanism adjustable.

With this configuration, the backlash and a fall-down between the spherical joint element and the cylindrical joint element become hard to occur by properly adjusting the axial distance between the feed nuts and the width of the slit by use of the back lash adjusting means.

EMBODIMENTS OF THE INVENTION

Embodiments of an electrically-driven steering column apparatus of the present invention will hereinafter be described with reference to the drawings.

Figure 1:
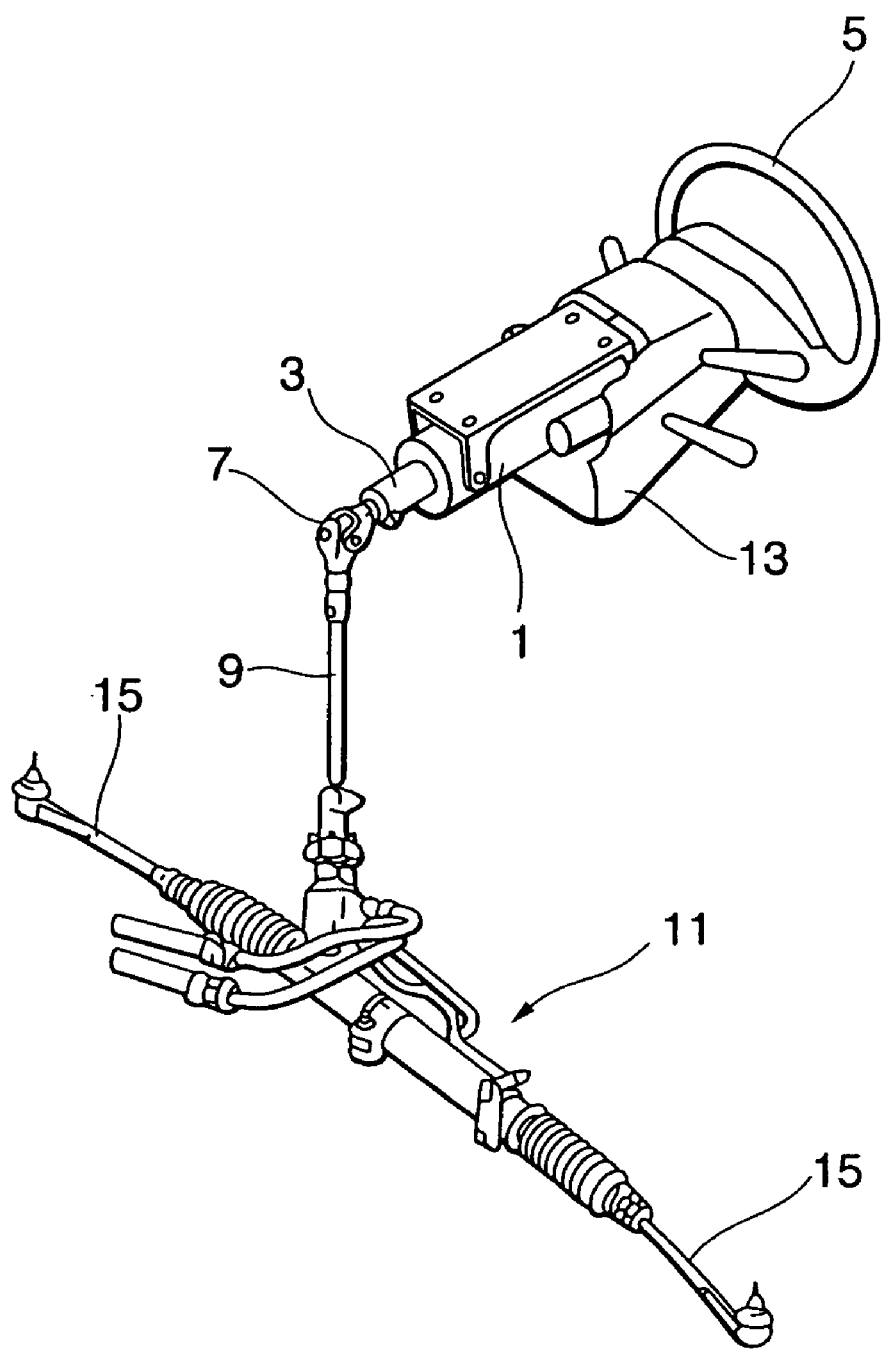
FIG. 1 is a perspective view showing car-room-side components of a hydraulic power steering apparatus in an embodiment of the present invention.

FIG. 1 is a perspective view showing car-room-side components of a hydraulic power steering apparatus in accordance with a first embodiment. A member designated by the numeral 1 in FIG. 1 is a steering column that rotatably supports an upper steering shaft 3. A steering wheel 5 is attached to an upper end of the upper steering shaft 3, and a lower steering shaft 9 is connected via a universal joint 7 to a lower end thereof.

A steering gear 11 constructed of a rack & pinion mechanism, a hydraulic power assist mechanism, etc. is further connected to a lower end of the lower steering shaft 9. Referring again to FIG. 1, the numeral 13 represents a column cover for covering the steering column 1, and the numeral 15 denotes a tie rod connected to right and left ends of the steering gear 11.

Figure 2:
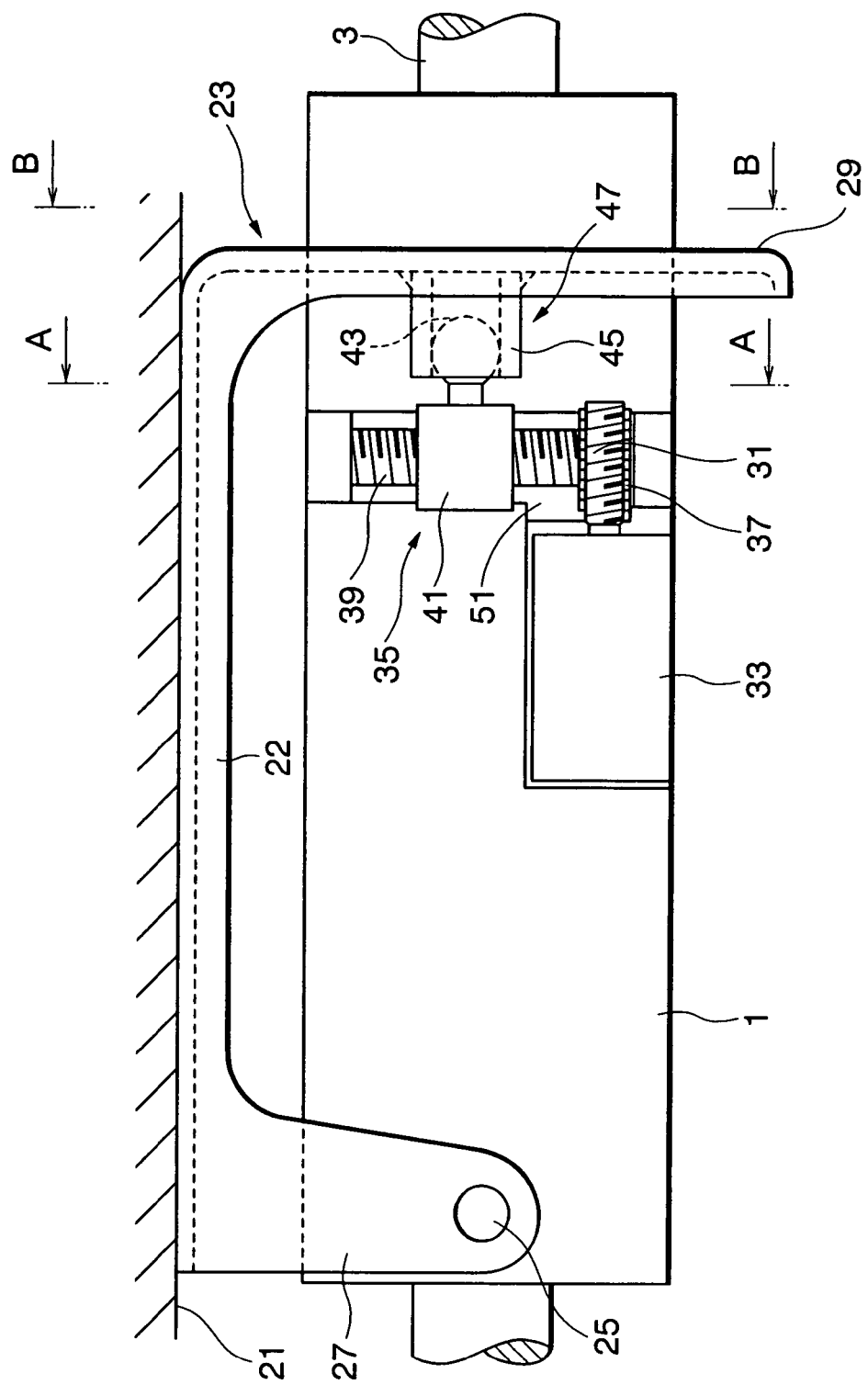
FIG. 2 is a schematic view showing a configuration of the electrically-driven tilt type steering column apparatus in the first embodiment of the present invention.
Figure 3:
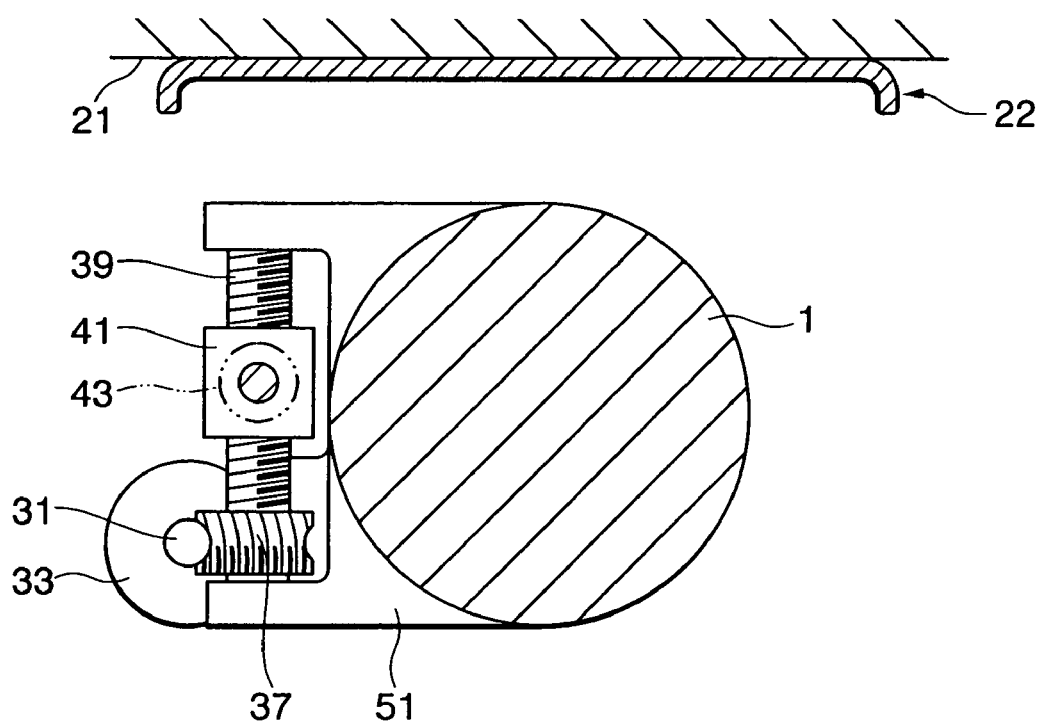
FIG. 3 is a sectional view taken along the line A-A in FIG. 2.
Figure 4:
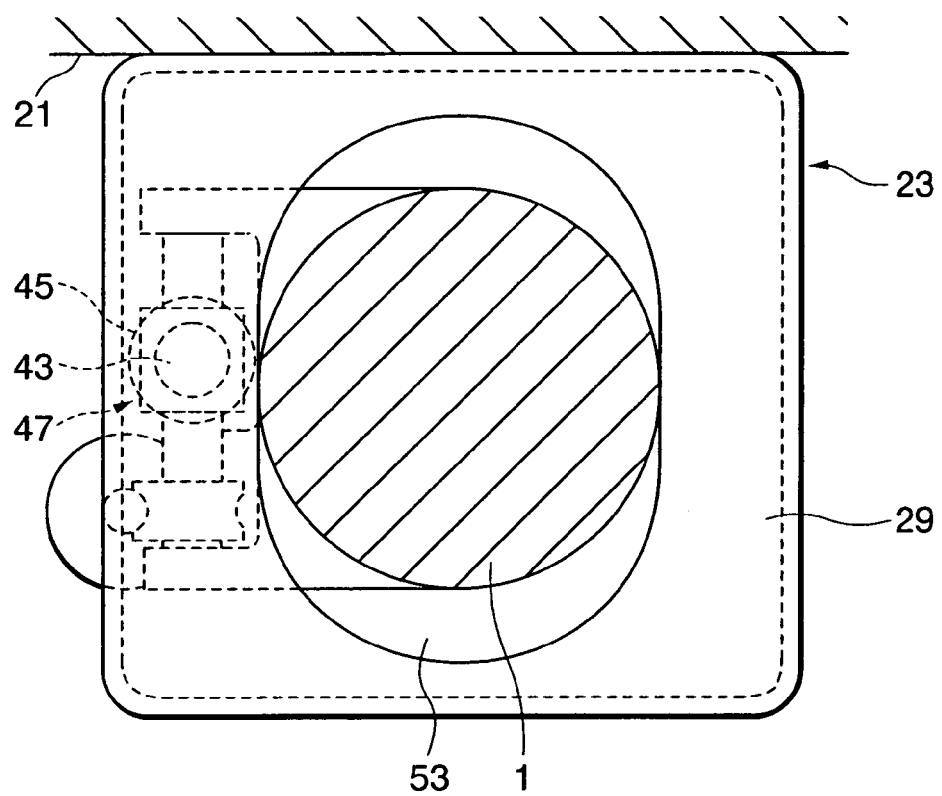
FIG. 4 is a sectional view taken along the line B-B in FIG. 2.

FIG. 2 is a schematic view showing a configuration of the electrically-driven tilt type steering column apparatus in the first embodiment of the present invention. FIG. 3 is a sectional view taken along the line A-A in FIG. 2. FIG. 4 is a sectional view taken along the line B-B in FIG. 2. Note that a left side in FIG. 2 corresponds to a front part, a left side in each of FIGS. 3 and 4 corresponds to a left part, and an upper side in each of FIGS. 1 through 3 corresponds to an upper part in the description of the apparatus.

As shown in FIG. 2, the steering column 1 is supported on a column bracket 23 that is a steel plate press molded product fixed to a car-body-side member 21 in a swingable manner about a pivot pin 25 serving as a fulcrum and defined as a tilt pivot. The column bracket 23 is constructed of a fitting member 22 fixed to the car-body-side member 21, a pivot member 27 extending downwards from a front side end of the fitting member 22, and a column support member 29 extending downwards from a rear end of the fitting member 22.

A side surface of the steering column 1 is fitted with an electric motor 33 having a motor shaft (unillustrated) to which a worm gear 31 is fixed and with a feed screw mechanism 35 defined as a power transmission means. The feed screw mechanism 35 includes a feed screw shaft 39 to which a worm wheel 37 meshing with the worm gear 31 is fixed, and a slider 41 defined as a feed nut screw-engaged onto the feed screw shaft 39. A ball stud 43 defined as a spherical joint element is fixed to a rear side of the slider 41 on one hand, and a sleeve 45 defined as cylindrical joint element is fixed to the column support member 29 of the column bracket 23 on the other hand, wherein the ball stud 43 is slidably fitted in the sleeve 45, thereby configuring a joint 47.

A member designated by the numeral 51 in FIGS. 2 and 3 is a bracket used for supporting the electric motor 33 and the feed screw shaft 39. The feed screw shaft 39 is rotatably supported on an unillustrated rolling bearing held by the bracket 51. Further, the numeral 53 in FIG. 4 represents an elongate hole formed in the column support member 29 of the column bracket 23, and the steering column 1, when in a tilt operation, loosely moves within this elongate hole 53.

An operation in the first embodiment will hereinafter be discussed.

In the power steering apparatus according to the first embodiment, if there arises a necessity of adjusting an up-and-down position of the steering wheel 5 because of an exchange of a driver, etc., the electric motor 33 is rotationally driven in one of forward and reverse directions by manipulating an unillustrated switch. Thereupon, rotations of the electric motor 33 are decelerated and transmitted to the worm wheel 37 from the worm gear 31, with the result that the feed screw shaft 39 integral with the worm wheel 37 rotates, whereby, e.g., the slider 41 descends with respect to the steering column 1.

Figure 5:
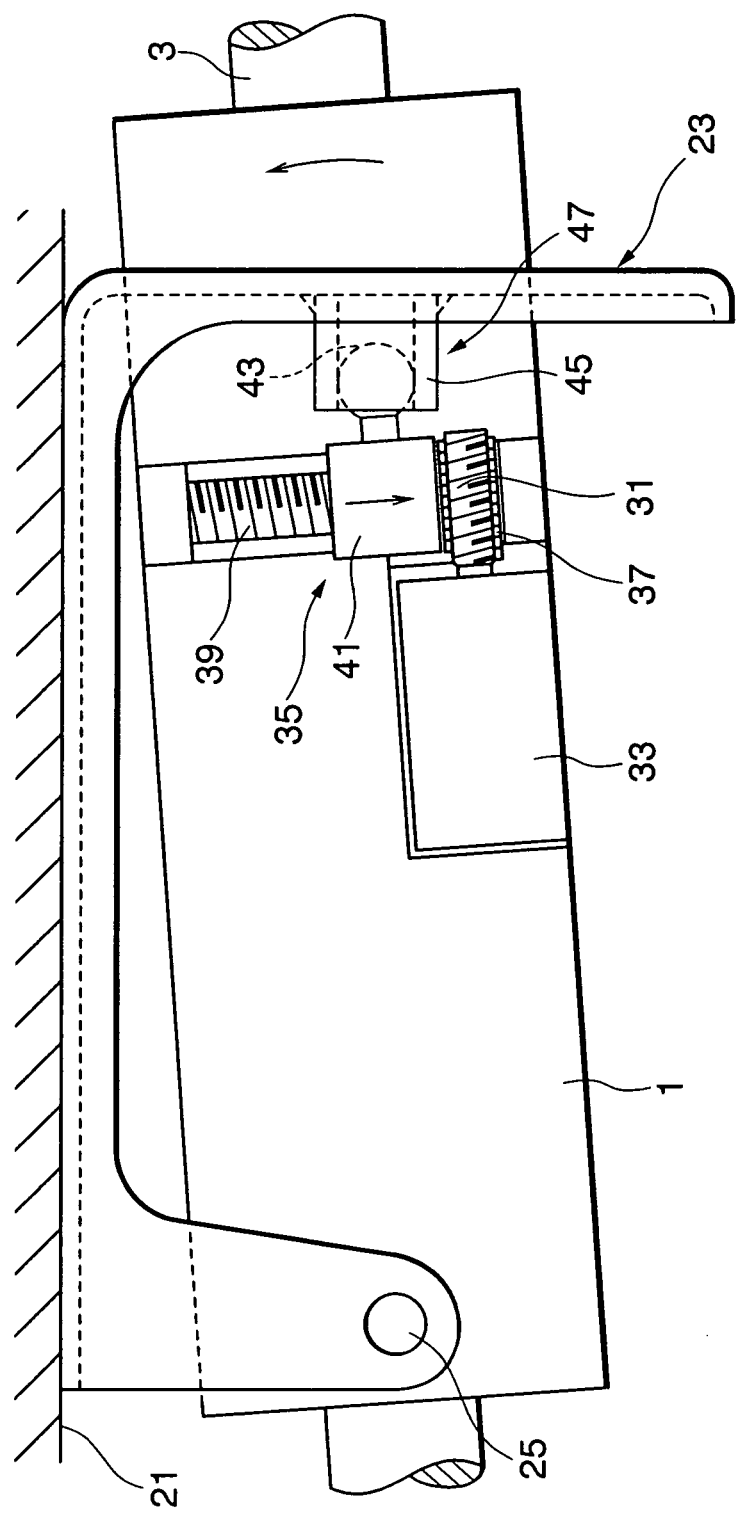
FIG. 5 is an explanatory view showing a tilt operation in the embodiment.
Figure 6:
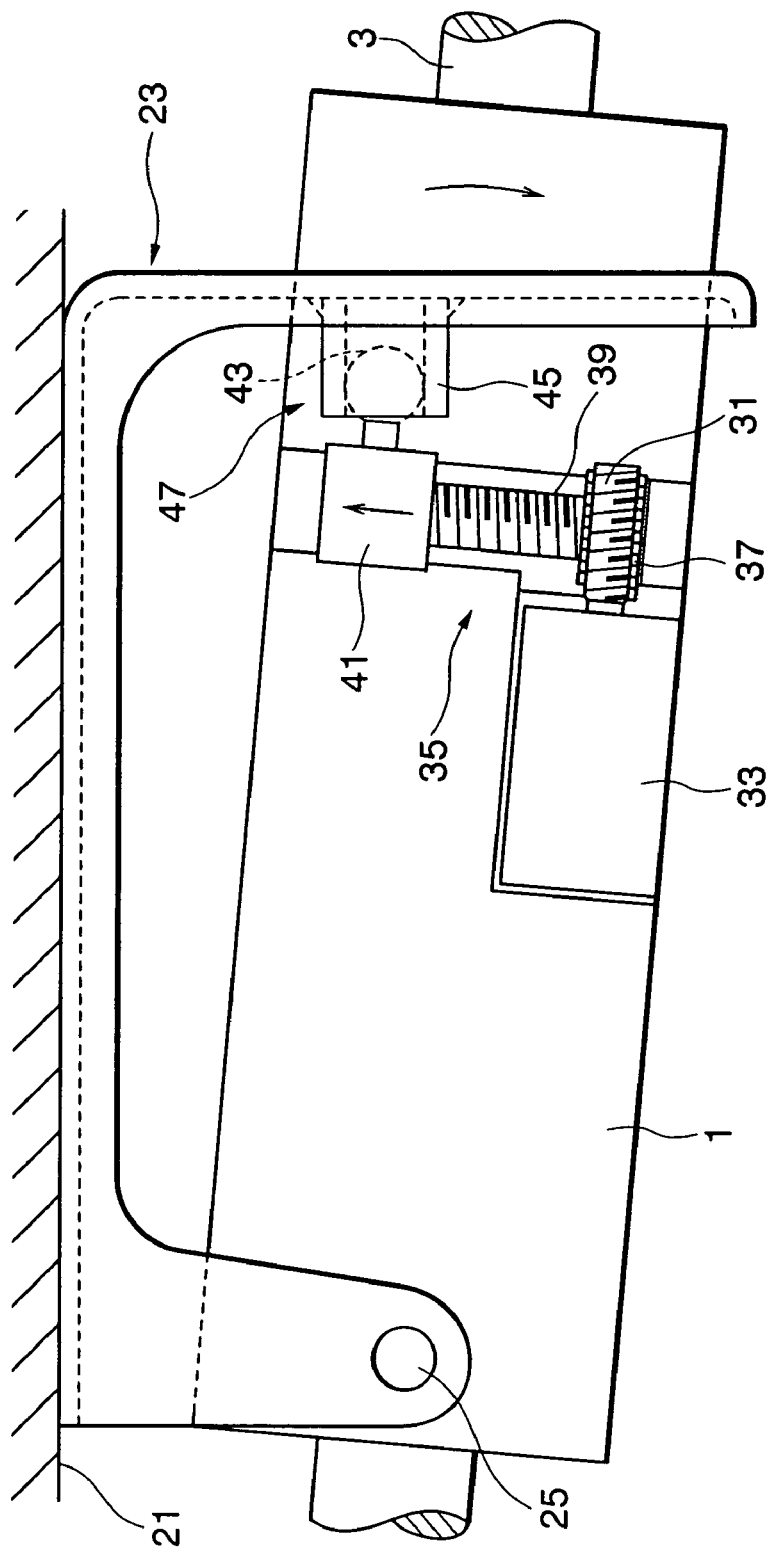
FIG. 6 is an explanatory view showing the tilt operation in the embodiment.

Then, it follows that the ball stud 43 fixed to the slider 41 descends likewise with respect to the steering column 1, and, the ball stud 43 engaging with the sleeve 45, as shown in FIG. 5, the steering column 1 is tilted up. Further, when the slider 41 ascends, through procedures opposite to the above-mentioned, as shown in FIG. 6, the steering column is tilted down.

Figure 7:
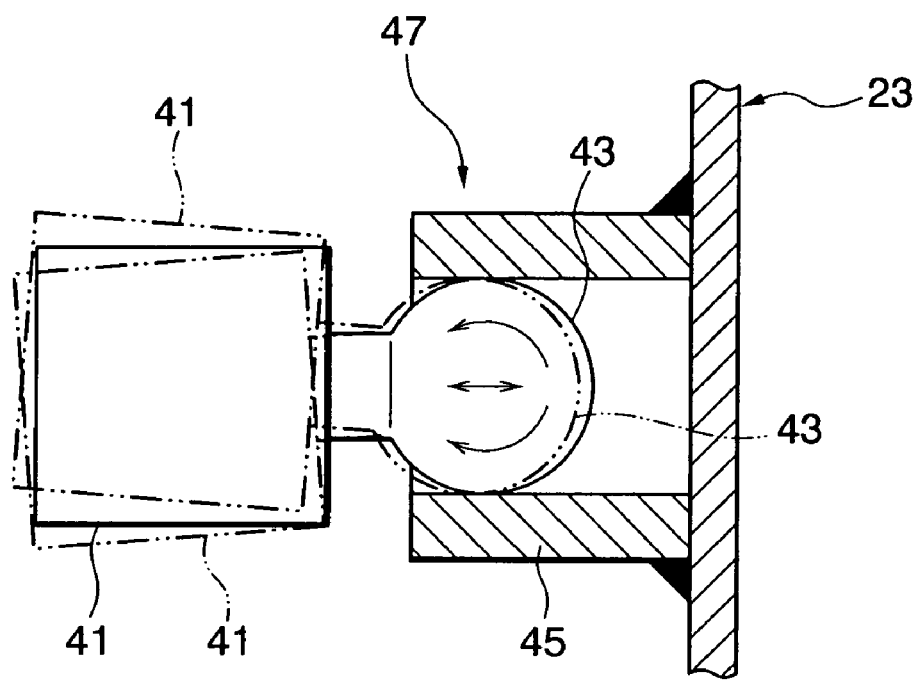
FIG. 7 is an explanatory view showing a state of how a ball stud engages with a sleeve.

The ball stud 43, on the occasion of the tilting motion of the steering column 1, as in FIG. 7 showing an enlarged view, moves back and forth while rotating within the sleeve 45. In the case of the first embodiment, however, the ball stud 43 defined as the spherical joint element rotates with no obstruction within the sleeve 45 defined as the cylindrical joint element and slides in the axial directions thereof, and hence there is neither a hindrance to the tilting motion of the steering column 1 nor occurrences of unnecessary stress on and friction against the respective constructive members.

Thus, the electrically-driven tilt type steering column apparatus in the first embodiment does not necessitate an angular bearing and a link mechanism that have been employed so far in the conventional apparatuses, whereby an extremely compact framework of the apparatus can be attained and the smooth operation can be actualized in a way that remarkably reduces the number of the constructive members.

Note that inversely to the first embodiment discussed above, the sleeve 45 may be fixed to the slider 41, and the ball stud 43 may also be fixed to the column support member 29 of the column bracket 23.

Figure 8:
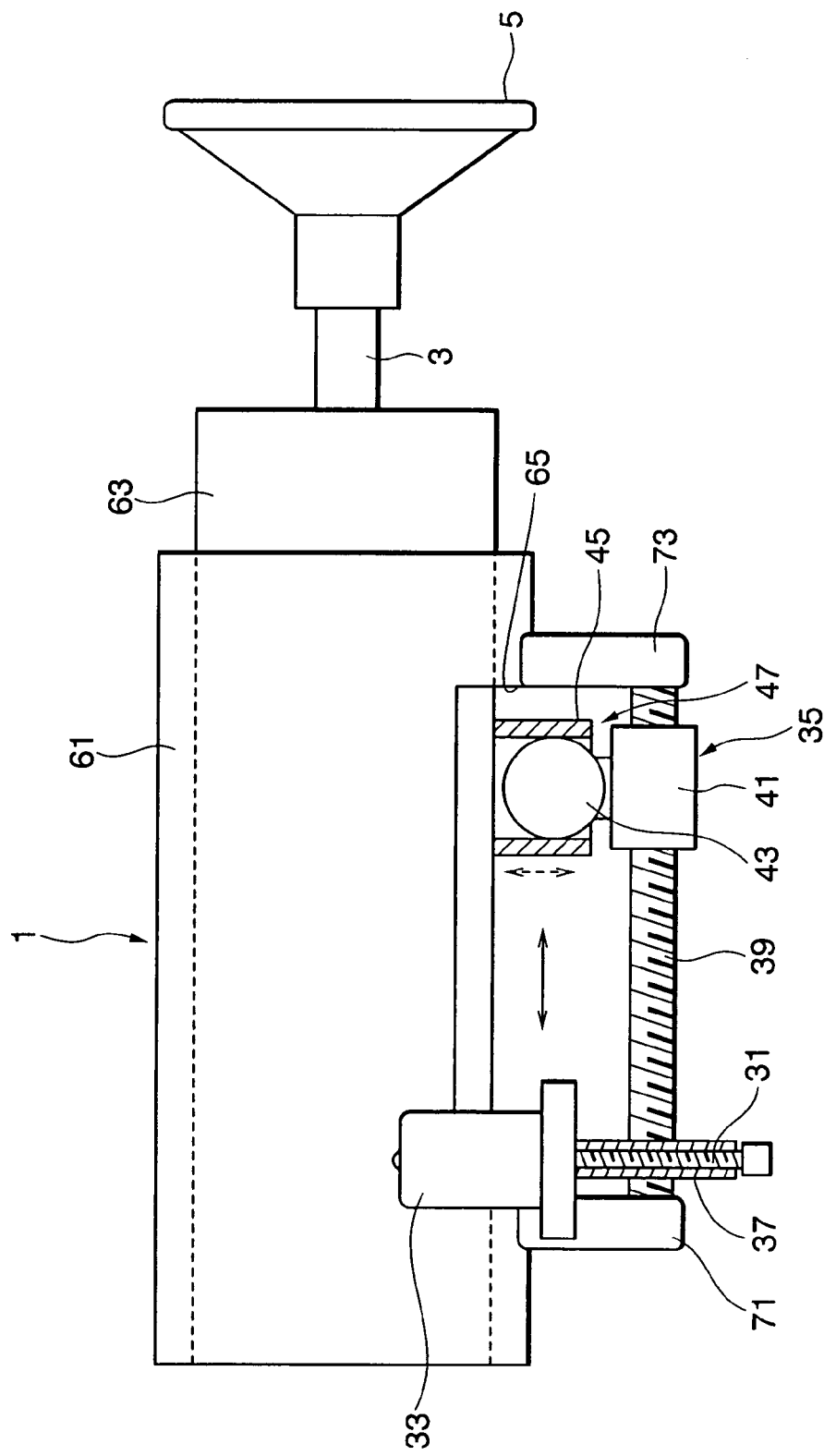
FIG. 8 is a side view showing an electrically-driven telescopic type steering apparatus in a second embodiment of the present invention.
Figure 9:
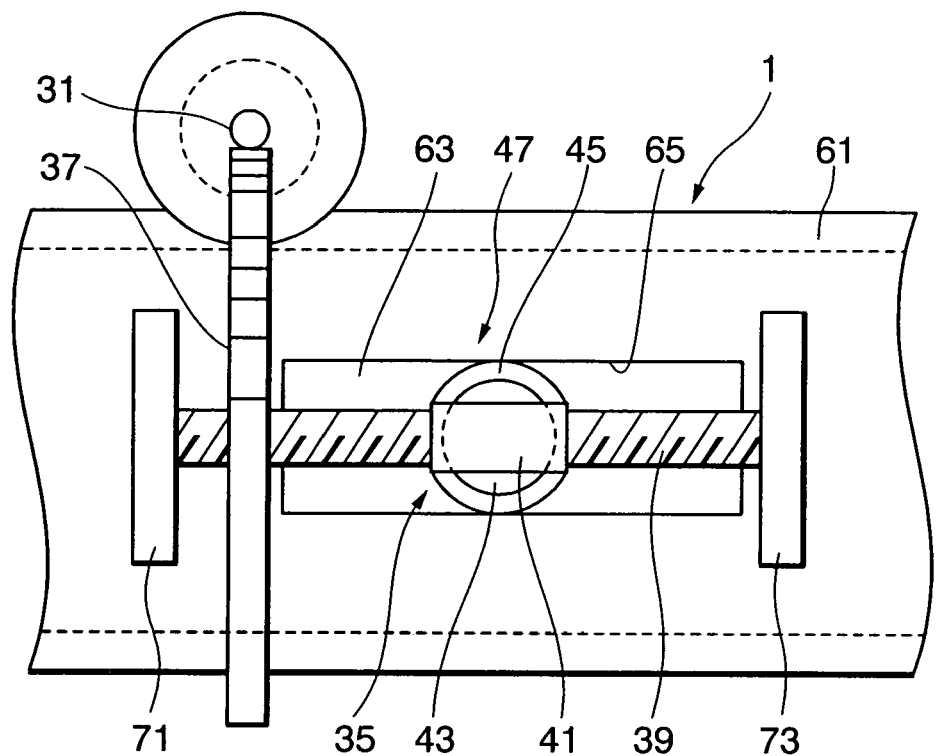
FIG. 9 is a bottom plan view of the steering apparatus in the second embodiment.

FIGS. 8 and 9 are views of an electrically-driven telescopic type steering apparatus as viewed respectively from sideways and from under according to a second embodiment of the present invention. As illustrated in FIGS. 8 and 9, in the steering column 1 according to the second embodiment, an inner column 63 is slidably fitted in an outer column 61. An opening 65 taking a substantially rectangular shape is formed in a lower portion of the outer column 61, and, through this opening 65, the sleeve 45 defined as the cylindrical joint element protrudes downwards and outwards from the inner column 63. Note that the opening 65 performs a function as a stopper when in a telescopic operation and also a function as a rotation preventer in a rotating direction of the inner column 63.

Further, a steering shaft 3 provided with the steering wheel 5 at its front end is rotatably sustained in the inner column 63.

The lower steering shaft is connected via the universal joint to a lower side end of the steering shaft 3, and further the rack & pinion mechanism and the hydraulic power steering mechanism are connected to the lower side end thereof. Support holders 71, 73 extending downwards and protruding outwards are provided at front and rear portions of the outer column 61 with the opening 65 interposed therebetween, and both ends of the axially-extended feed screw shaft 39 structuring the feed screw mechanism 35, are rotatably supported by these support holders 71, 73. Moreover, the worm wheel 37 fixed to the feed screw shaft 39 and the worm gear 31 fixed to an output shaft of the electric motor 33, are interposed between the feed screw shaft 39 and the output shaft of the electric motor 33, whereby the rotations of the electric motor 33 are decelerated and transmitted to the feed screw shaft 39. The electric motor 33 is attached to the outer column 61.

The slider 41 defined as the feed nut structuring the feed screw mechanism 35 is screw-engaged onto the feed screw shaft 39, whereby the slider 41 moves in the axial directions (as a set of arrowheads indicated in FIG. 8) when the feed screw shaft 39 rotates. The ball stud 43 defined as the spherical joint element is fixed on the side of the steering shaft 3. This ball stud 43 is slidably fitted in the sleeve 45 and, when the feed screw shaft 39 rotates, moves the sleeve 45 in the axial directions (as another set of arrowheads indicated in FIG. 8).

Figure 10:
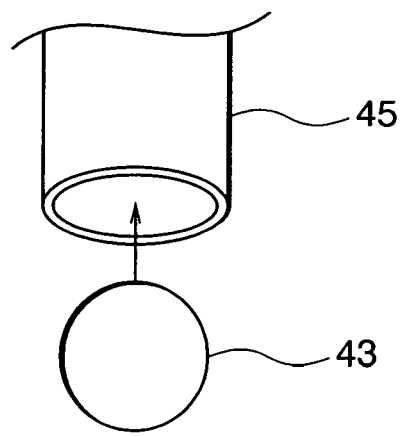
FIG. 10 is an explanatory view showing a state of how the ball stud engages with the sleeve in the second embodiment.

Therefore, according to the second embodiment, the sleeve 45 is provided on the side of the inner column 63, and the ball stud 43 slidably fitted in the interior of the sleeve 45 is provided on the side of the outer column 61. Thus, it may be sufficient to simply fit the ball stud 43 into the sleeve 45 as illustrated in FIG. 10. With this contrivance, even if an axis deviation occurs to some extent between the feed screw shaft 39 and the steering shaft 3, the joint 47 composed of the ball stud 43 and the sleeve 45 relatively slides, thereby absorbing this axis deviation.

If there occurs a deviation in parallelism of the feed screw shaft 39 with respect to the steering shaft 3, a ball unit 43 autonomously rotates and slides within the sleeve 45 when in the telescopic operation, thereby absorbing this deviation and also a deviation in parallelism that might occur when assembling the components. Further, if there occurs a deviation in axis-to-axis distance between the feed screw shaft 39 and the steering shaft 3, the ball stud 43 slides in the axial directions within the sleeve 45, thereby absorbing the deviation in axis-to-axis distance that might be caused when assembling the components, and so on. Hence, even if the deviation between the feed screw shaft 39 and the steering shaft 3 occurs due to an error, etc. in assembly of the components and if there occur the deviations in parallelism and in axis-to-axis distance, these deviations are absorbed by the ball stud 43 rotating and sliding within the sleeve 45.

Figure 11:
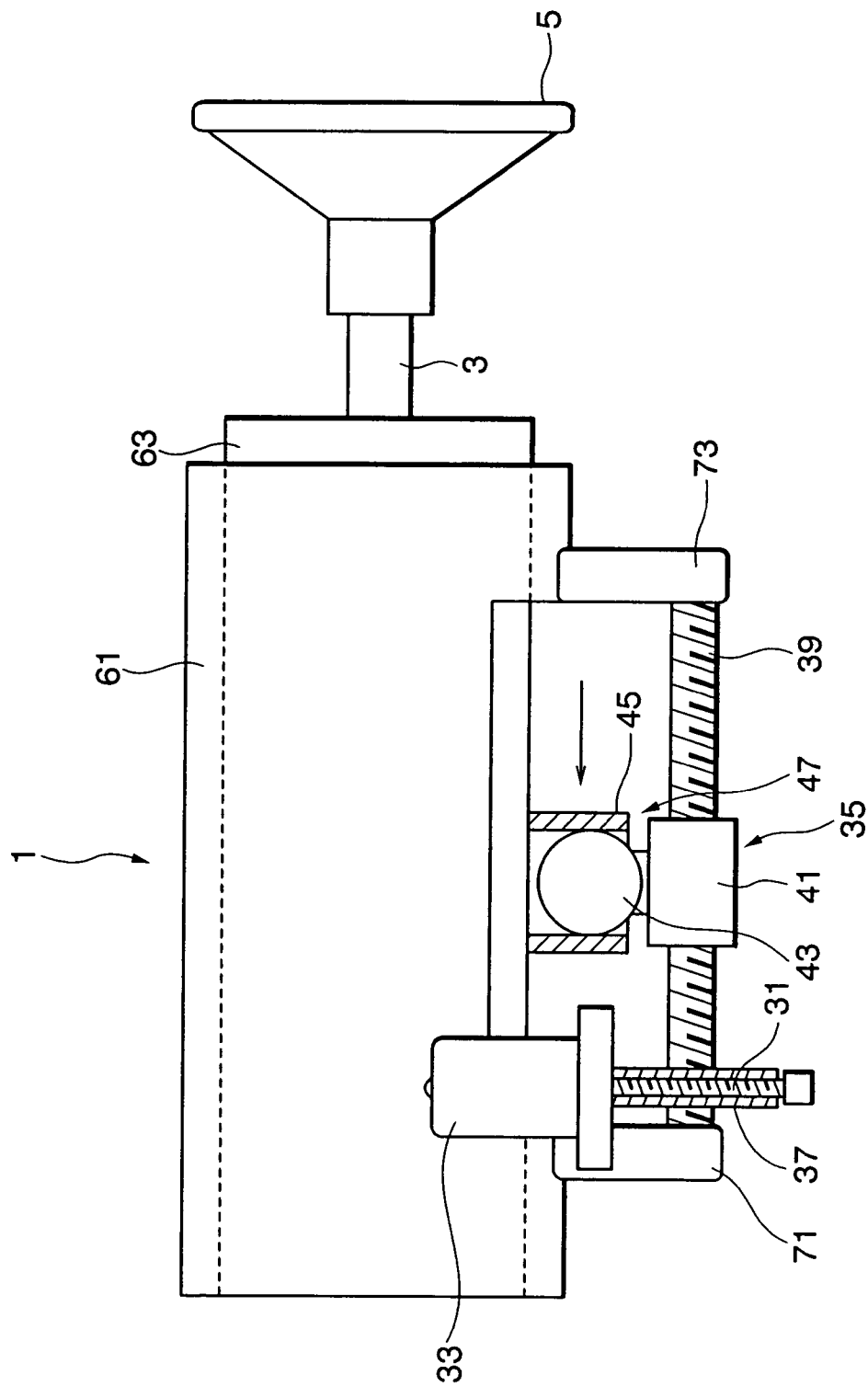
FIG. 11 is a view showing how the steering apparatus in the second embodiment operates.

Even if there occurs the deviation in parallelism between the steering shaft 3 and the feed screw shaft 39, this deviation can be absorbed by rotating and sliding of the ball stud 43 within the sleeve 45. Furthermore, even if there is caused the deviation in axis-to-axis distance between the steering shaft 3 and the feed screw shaft 39, this deviation can be absorbed by the ball stud 43 sliding within the sleeve 45 in directions indicated by arrowheads of one-dotted chain line in FIG. 11.

As a result, even if an assembly error occurs when assembling the components such as the support holders 71, 73 as the engagement members with the feed mechanism, the feed screw shaft 39, etc., this assembly error is absorbed by the joint 47 constructed of the ball stud 43 and the sleeve 45. Then, the telescopic mechanism of the steering column 1 is configured by a simple structure, resulting in a less possibility of generating extra vibrations and noises, etc. Further, the engagement of the ball stud 43 with the sleeve 45 is attained by the simple and compact structure, and it is therefore feasible to save a space for the apparatus and to reduce the costs for the apparatus without a high accuracy required of manufacturing and assembling the component such as the feed screw shaft 39, etc.

Note that inversely to the second embodiment discussed above, the sleeve may be provided on the side of the outer column 61, the ball stud may be provided on the side of the inner column 63, and the ball stud may be engaged with the sleeve. In this case also, the same operation and effects as those in the second embodiment can be exhibited.

Electrically-driven steering apparatuses in third through fifth embodiments of the present invention will hereinafter be explained. All these embodiments relate to the joints, and other configurations are the same as those in the first and second embodiments discussed above. According to the third through fifth embodiments, a synthetic resin member is interposed between the ball stud 43 defined as the spherical joint element and the sleeve 45 defined as the cylindrical joint element. The synthetic resin member in the third through fifth embodiments is formed by injection molding, a cutting work, etc. A variety of materials, which can be adopted for the synthetic resin member, are a polyacetal resin, a polyamide resin, an oil-impregnated resin, an ethylene tetrafluoride and a resin mixed with a low-friction material such as ethylene tetrafluoride, etc.

Figure 12:
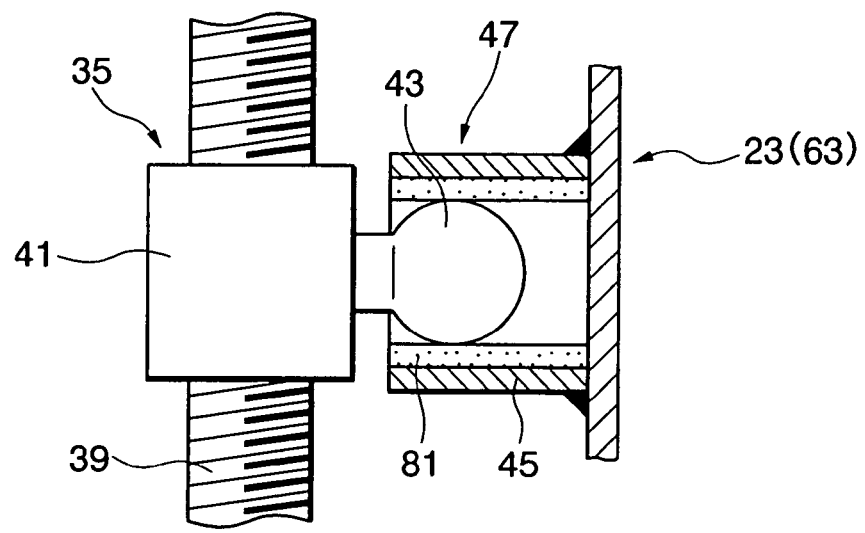
FIG. 12 is a vertical sectional view showing principal components of the electrically-driven apparatus in a third embodiment of the present invention.

FIG. 12 is a vertical sectional view showing principal components of the electrically-driven steering apparatus in the third embodiment of the present invention. In the case of the third embodiment, as illustrated in FIG. 12, a cylindrical synthetic resin sleeve 81 formed by the injection molding, the cutting work, etc. is fitted in and fixed to the sleeve 45. Dimensions of minor and major diameters of the synthetic resin sleeve 81 are properly set corresponding to a major diameter of the ball stud 43 and a minor diameter of the sleeve 45. For example, the sleeve 81 is fitted with a predetermined slack to the ball stud 43 but is, on the other hand, fitted by fastening to the sleeve 45. The third embodiment adopts this contrivance, thereby making it possible to substantially eliminate a backlash caused when the ball stud 43 rotates and slides in the axial directions within the sleeve 45 and to, at the same time, prevent an emission of noises and an occurrence of abrasion due to a metal-to-metal contact.

Figure 13:
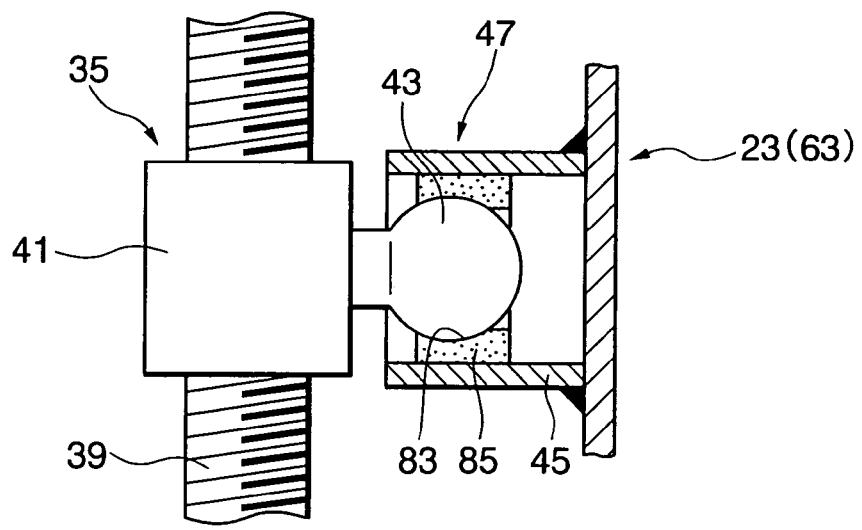
FIG. 13 is a vertical sectional view showing principal components of the electrically-driven apparatus in a fourth embodiment of the present invention.
Figure 14:
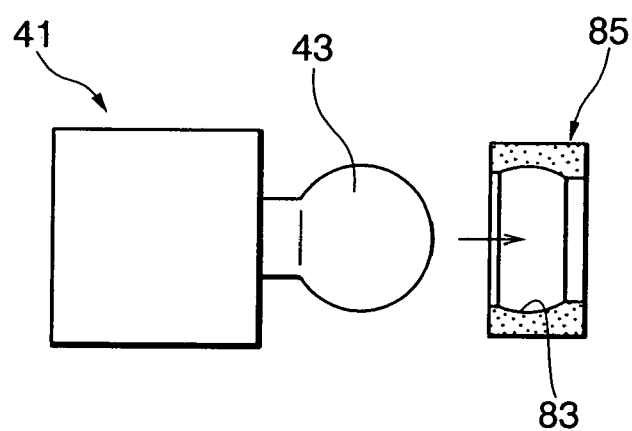
FIG. 14 is a view showing a method of assembling a joint in the fourth embodiment.
Figure 15:
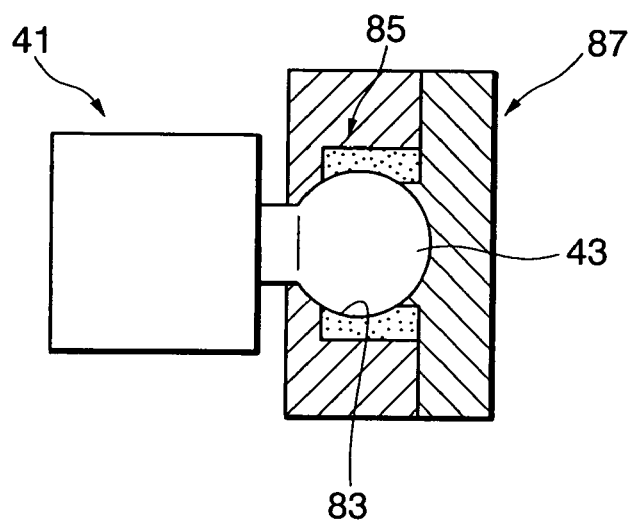
FIG. 15 is a view showing a method of manufacturing a synthetic resin slider in the fourth embodiment.
Figure 16:
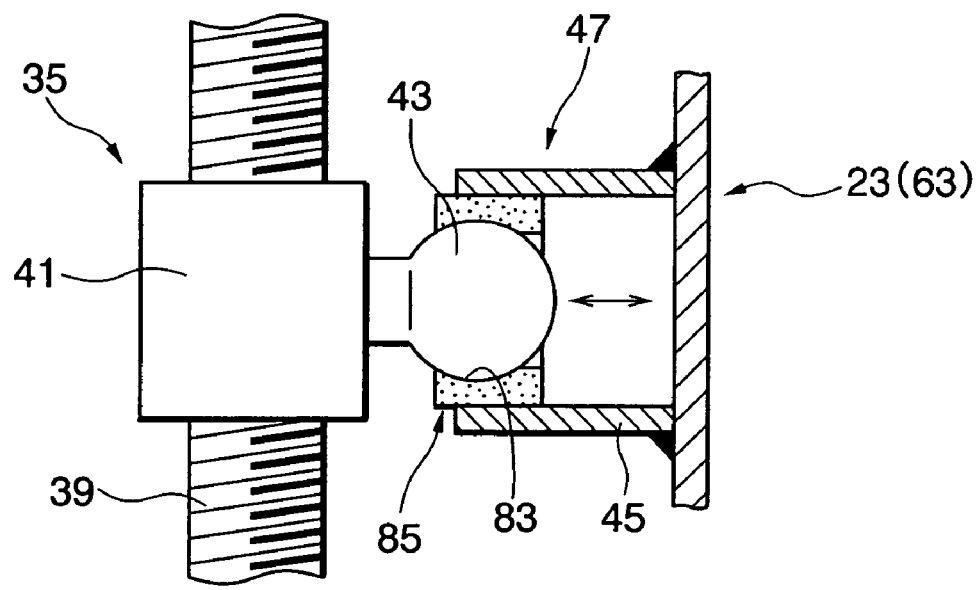
FIG. 16 is an explanatory view showing an operation in the fourth embodiment.

FIG. 13 is a vertical sectional view showing principal components of the electrically-driven steering apparatus in the fourth embodiment of the present invention. In the case of the fourth embodiment, a synthetic resin slider 85 having a concave spherical surface 83 and fitted on the ball stud 43, is slidably fitted in the sleeve 45. The synthetic resin slider 85 may be, as shown in FIG. 14, formed by the injection molding in accordance with a length of fitting thereof to the ball stud 43, wherein the ball stud 43 is press-fitted in the thus formed slider 85; and the synthetic resin slider 85 may be formed by the injection molding in a way that, as shown in FIG. 15, sets the ball stud 43 in a die assembly 87, and may also be formed by the injection molding directly between the ball stud 43 and the sleeve 45. The fourth embodiment adopts this configuration, thereby preventing the backlash, the emission of noises and the occurrence of abrasion as in the third embodiment and further, as shown in FIG. 16, preventing the deviation between the ball stud 43 and the synthetic resin slider 85 even when the ball stud 43 slides within the sleeve 45, with the result that the ball stud 43 smoothly rotates within the synthetic resin slider 85.

Figure 17:
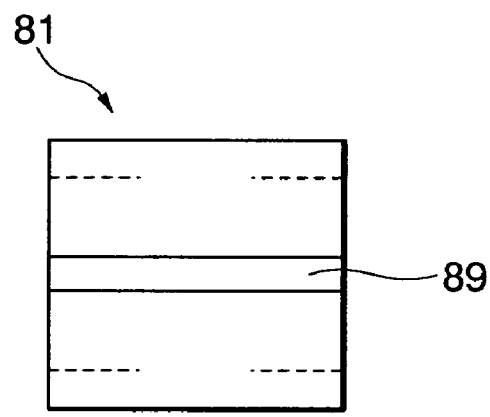
FIG. 17 is a side view showing a synthetic resin sleeve in a fifth embodiment of the present invention.
Figure 18:
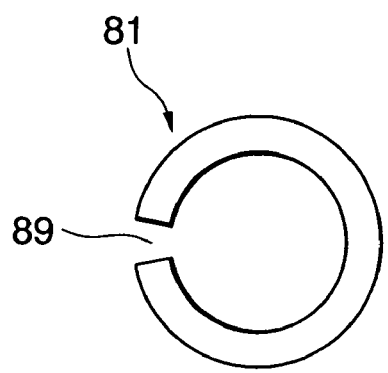
FIG. 18 is a front view of the same synthetic resin sleeve in the fifth embodiment.

FIG. 17 is a side view showing a synthetic resin sleeve in fifth embodiment of the present invention. FIG. 18 is a front view showing the same. In the case of the fifth embodiment, the whole configuration of the apparatus is the same as that in the third embodiment discussed above, however, the synthetic resin sleeve 81 is formed by the injection molding, the cutting work, etc. and is formed partially with, as shown in FIGS. 17 and 18, a slit 89 extending in the axial directions thereof. The fifth embodiment adopts this configuration, whereby the synthetic resin sleeve 81 is easily flexed in the radial directions, which eliminates the necessity of precisely setting the dimensions of the minor and major diameters with respect to the minor diameter of the sleeve 45 and the major diameter of the ball stud 43 and makes an operational defect, etc. hard to occur due to a thermal expansion and so on.

Electrically-driven steering apparatuses in sixth through eleventh embodiments of the present invention, will hereinafter be discussed. All these embodiments relate to the feed screw mechanism 35, and other configurations are the same as those in the first and second embodiment described above. The sixth embodiment is that the feed nut is divided into two pieces of feed nuts, and an axial distance between these two feed nuts is made adjustable. Further, according to the seventh through ninth embodiments, the feed nut is formed with the slit, and a width of this slit is made adjustable.

Figure 19:
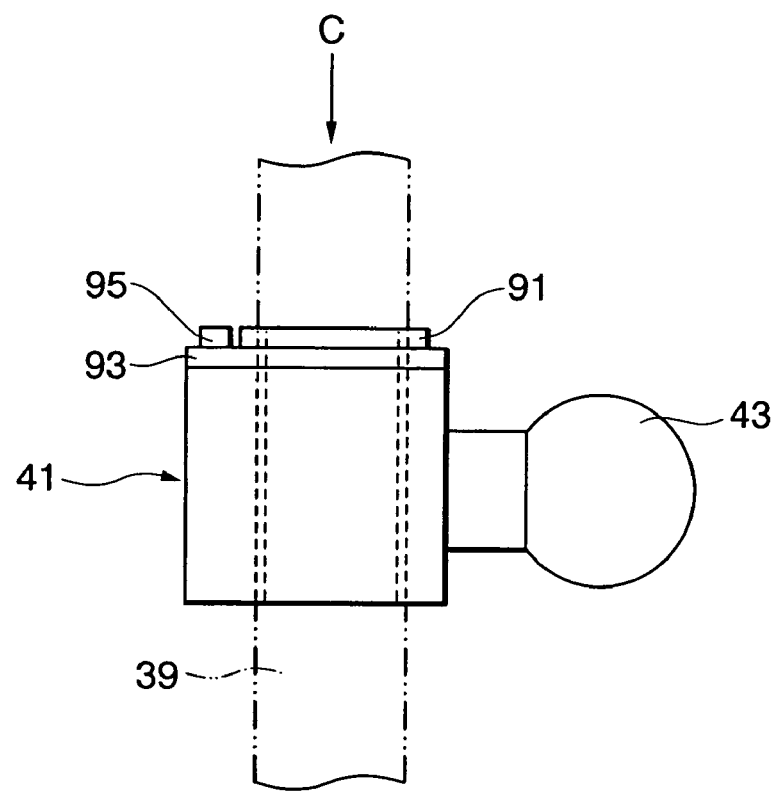
FIG. 19 is a side view showing a feed screw mechanism in a sixth embodiment of the present invention.
Figure 20:
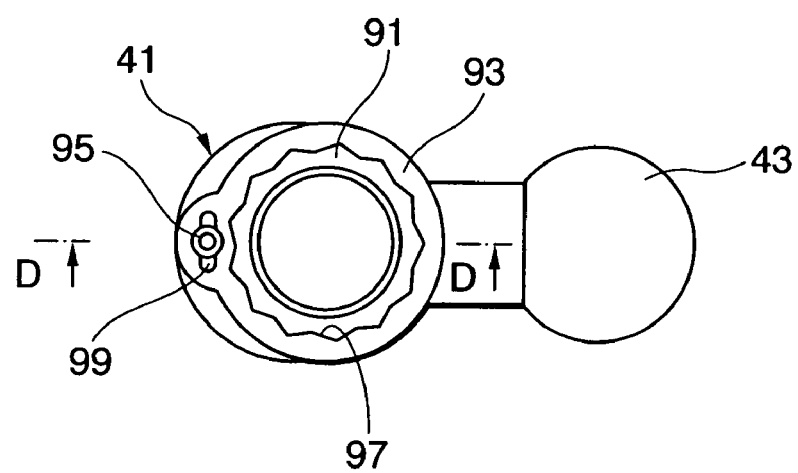
FIG. 20 is a view taken along the arrowed line C in FIG. 19.
Figure 21:
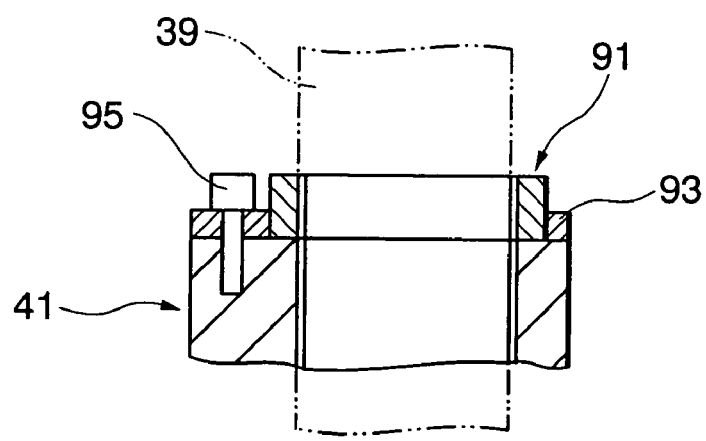
FIG. 21 is a sectional view taken along the line D-D in FIG. 20.

FIG. 19 is a side view showing the feed screw mechanism in the sixth embodiment. FIG. 20 is a view taken along the arrowed line C in FIG. 19. FIG. 21 is a sectional view taken along the line D-D in FIG. 20. In the case of the sixth embodiment, the whole configuration of the apparatus is the same as the first and second embodiments described above have, however, a dodecagonal drive adjust nut 91 defined as a second feed nut is attached to a side end surface (upper side in FIG. 19) of the slider 41 defined as the feed nut. The adjust nut 91 is screw-engaged onto the feed screw shaft 39 and advances towards or recedes away from the slider 41 as the adjust nut 91 rotates. The adjust nut 91 is fixed to the end surface (upper side in FIG. 19) of the slider 41 through a fixing ring 93 defined as a backlash adjusting means and through a locking screw 95. The fixing ring 93 includes a dodecagonal hole 97 into which the adjust nut is fitted and an elongate hole 99 through which the locking screw 95 penetrates. Note that the adjust nut 91 may involve using a hexagonal drive nut, a square drive nut, etc. as a substitute for the dodecagonal drive nut, and the fixing ring 93 may involve using a ring formed with a hexagonal hole, a square hole, etc. as a substitute for the dodecagonal hole.

According to the sixth embodiment, if an excessive backlash exists between the slider 41 and the feed screw shaft 39, an assembly worker advances the adjust nut 91 towards the slider 41 by use of spanner, etc. and fixes the adjust nut 91 by use of the fixing ring 93 and the locking screw 95 just when a proper backlash is acquired. Note that the fixing ring 93 has the dodecagonal hole 97 and the elongate hole 99, and hence the adjust nut 91 can be fixed to the slider 41 at a desired rotational angle. The sixth embodiment adopts this configuration, thereby restraining a tilt, etc. of the slider 41 to the feed screw shaft 39 when the feed screw mechanism 35 operates and improving a support rigidity, etc. of the steering column 1.

Figure 22:
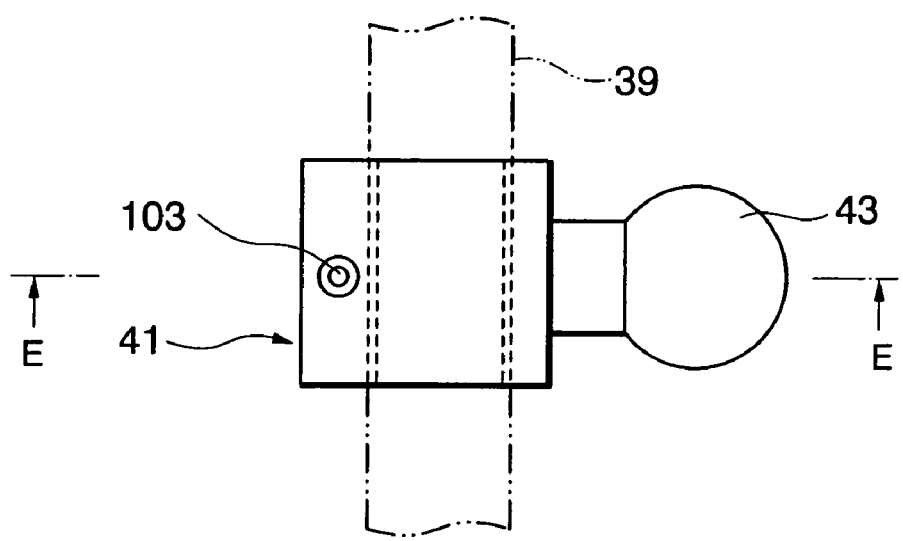
FIG. 22 is a side view showing the feed screw mechanism in a seventh embodiment of the present invention.
Figure 23:
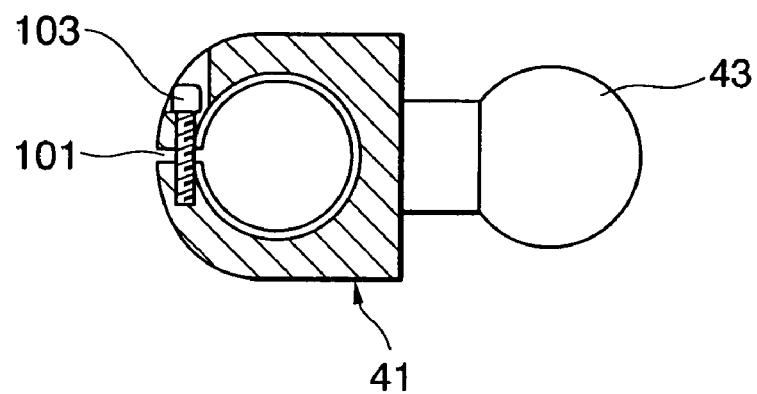
FIG. 23 is a sectional view taken along the line E-E in FIG. 22.

FIG. 22 is a side view showing the feed screw mechanism in the seventh embodiment of the present invention. FIG. 23 is a sectional view taken along the line E-E in FIG. 22. In the case of the seventh embodiment also, the whole configuration of the apparatus is the same as the second embodiment has, however, the slider 41 is formed with a slit 101 extending along an axis of the feed screw shaft 39 in a position where there is a 180° phase difference from the ball stud 43, and is provided with an adjust screw 103 defined as a backlash adjusting means for adjusting a width of this slit 101. According to the seventh embodiment, if an excessive backlash exists between the slider 41 and the feed screw shaft 39, the assembly worker narrows the width of the slit 101 by fastening the adjust screw 103 with a hexagonal wrench, etc., thereby reducing the backlash between the feed screw shaft 39 and the slider 41.

Figure 24:
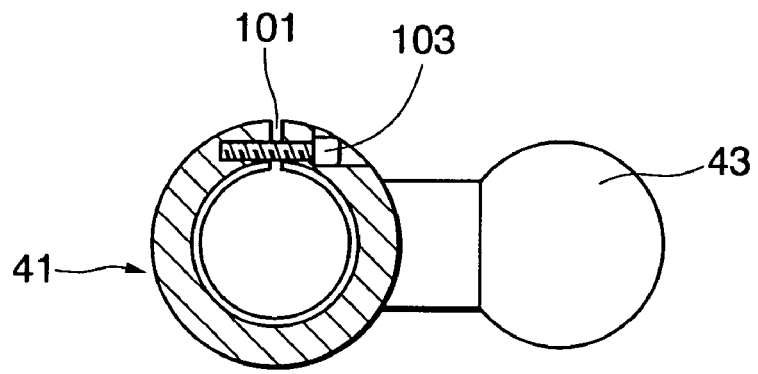
FIG. 24 is a cross sectional view showing the feed screw mechanism in an eighth embodiment of the present invention.
Figure 25:
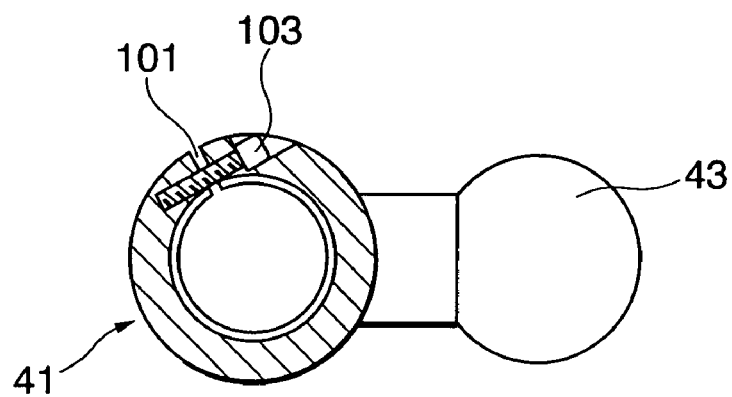
FIG. 25 is a cross sectional view showing the feed screw mechanism in a ninth embodiment of the present invention.

FIG. 24 is a cross sectional view showing the feed screw mechanism in the eighth embodiment of the present invention. FIG. 25 is a cross sectional view showing the feed screw mechanism in the ninth embodiment of the present invention. The eighth and ninth embodiments adopt substantially the same configuration as the seventh embodiment has, however, positions where the slits 101 are formed are different. To be specific, in the eighth embodiment, the slit 101 is formed in a position where there is a 90° phase difference from the ball stud 43. In the ninth embodiment, the slit 101 is formed in a position where there is a 120° phase difference from the ball stud 43. Note that the phase difference of the slit 101 from the ball stud 43 is not limited to 90° and 120°, but arbitrary angles are available.

Figure 26:
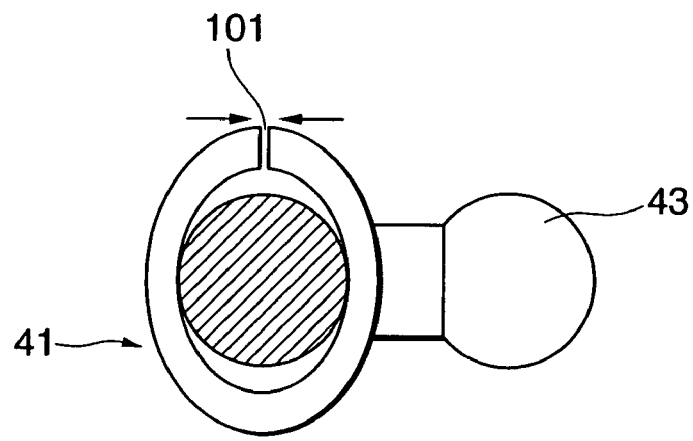
FIG. 26 is an explanatory view showing an operation in the eighth embodiment.
Figure 27:
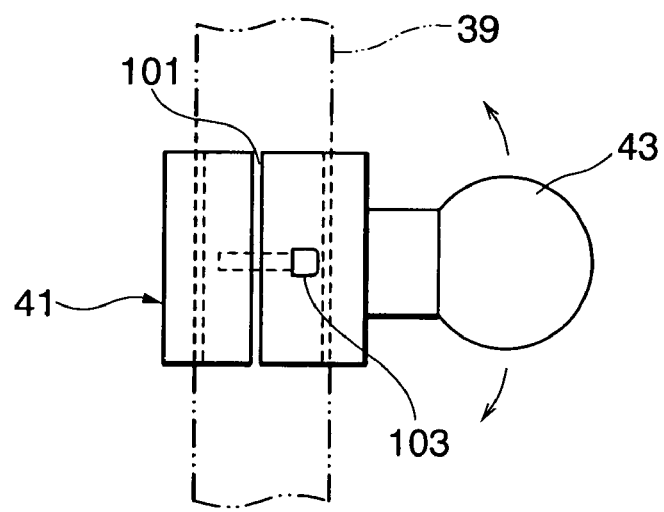
FIG. 27 is an explanatory view showing the operation in the eighth embodiment.
Figure 28:
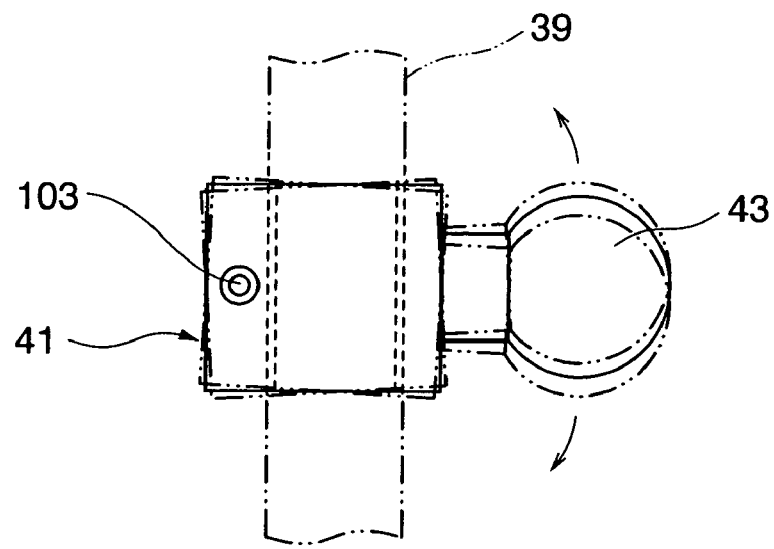
FIG. 28 is an explanatory view showing a state where the slider in the seventh embodiment tilts.

The operation in each of the eighth and ninth embodiments is substantially the same as that in the seventh embodiment, however, as a state of deformation of the slider 41 in the eighth embodiment is illustrated in exaggeration in FIG. 26, when fastening the adjust screw 103, the slider 41 elastically deforms in the right-and-left directions in FIG. 26 so as to eliminate a gap between the feed screw shaft 39 and the slider 41 itself. As a result, even when a bending moment is, as shown in FIG. 27, inputted from the ball stud 43 when the feed screw mechanism 35 operates, the slider 41 is hard to tilt. Note that FIG. 28 shows a state the slider 41 tilts due to the input of the bending moment from the ball stud 43 in the seventh embodiment.

Figure 29:
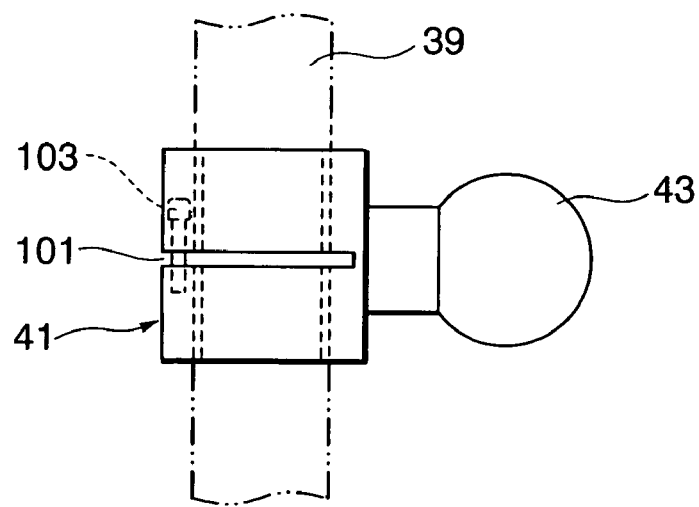
FIG. 29 is a side view showing the feed screw mechanism in a tenth embodiment of the present invention.
Figure 30:
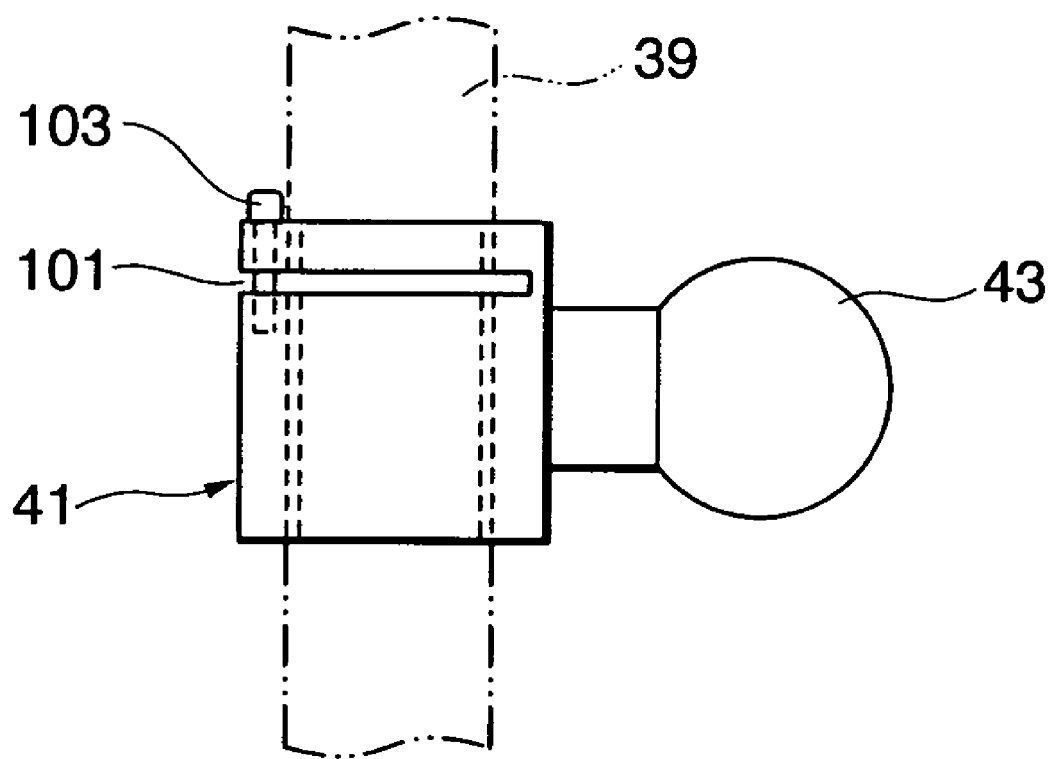
FIG. 30 is a side view showing the feed screw mechanism in an eleventh embodiment.

FIG. 29 is a side view showing the feed screw mechanism in the tenth embodiment of the present invention. FIG. 30 is a side view showing the feed screw mechanism in the eleventh embodiment. The whole configuration of the apparatus in each of the tenth and eleventh embodiments is the same as the first and second embodiments have, however, the slider 41 is formed with the slit 101 extending in directions that are right-angled to the axis of the feed screw shaft 39, and an adjust screw 103 for adjusting a width of this slit 101 is provided as a backlash adjusting means.

According to the tenth and eleventh embodiments, if an excessive backlash exists between the slider 41 and the feed screw shaft 39, the assembly worker narrows the width of the slit 101 by fastening the adjust screw 103 with the hexagonal wrench, etc., thereby reducing the backlash between the feed screw shaft 39 and the slider 41 as in the seventh embodiment discussed above. Note that the slit 101 shows a well-balanced condition in upper-and-lower directions, and the slider 41 comes to have a high strength, however, a high torque is required of fastening the adjust screw 103. On the other hand, in the case of the eleventh embodiment, the slider 41 is easy to elastically deform in an upper part of the slit 101, and hence the torque required of fastening the adjust screw 103 decreases with the result that the adjustment of the backlash is facilitated.

The specific descriptions of the embodiments come to an end so far. However, the mode of the present invention is not limited to the embodiments discussed above. For example, in each of the embodiments, the present invention is applied to the electrically-driven tilt type or electrically-driven telescopic type steering column apparatus. The present invention may be, however, applied to an electrically-driven tilt/telescopic type steering column apparatus. Further, the worm gear mechanism may involve using a mechanism constructed of the worm gear and a helical gear in addition to the mechanism constructed of the worm gear and the worm wheel. Moreover, the spherical joint element and the cylindrical joint element may be, in addition to their being fixed to the slider, the column bracket, etc., formed integrally with these components; or alternatively, the cylindrical joint element may be fixed to the slider, while the spherical joint element may be attached to a member on the face-to-face side. Further, the embodiments discussed above have exemplified the hydraulic power steering apparatus to which the present invention is applied, however, the present invention may be applied to the steering apparatuses such as the electrically-driven power steering apparatus, a manual steering apparatus and so forth. Still further, the whole configurations of the steering apparatus and of the electrically-driven steering column apparatus and the shapes of the respective members, can be properly changed if these changes fall within the range that does not deviate from the gist of the present invention.

As obvious from the discussion given above, the present invention enables the apparatus to be configured in a compact size and the smooth operation to be actualized while reducing the number of the members.

What is claimed is:

1. An electrically-driven steering column apparatus comprising:
    a steering shaft having a rear end to which a steering wheel is attached;
    a steering column rotatably holding said steering shaft and adapted for adjusting a position of said steering wheel;
    an electric motor which causes a position adjusting motion of said steering column; and
    a power transmission mechanism which transmits driving force of said electric motor to said steering column as a position adjusting motion driving force,
    wherein said power transmission mechanism includes a joint including a spherical joint element, a cylindrical joint element in which said spherical joint element is received, and a sleeve received in said cylindrical joint element and disposed between said spherical joint element and said cylindrical joint element, an inner peripheral surface of the sleeve being spherically concave and rotatably supporting said spherical joint element, and
    wherein said power transmission mechanism further includes a feed screw shaft being rotated by a shaft of said electric motor, said electric motor being oriented such that said shaft of said electric motor has an axis transverse to an axis of said feed screw shaft.

2. An electrically-driven steering column apparatus according to claim 1, wherein
    said sleeve is formed with an axial slit.

3. An electrically-driven steering column apparatus according to claim 1, wherein
    said sleeve is made of a synthetic resin material.

4. An electrically-driven steering column apparatus according to claim 1, wherein
    said steering column is capable of tilt position adjustment about a tilt pivot; and
    said power transmission mechanism transmits driving force of said electric motor to said steering column as a tilt motion driving force for said steering column.

5. An electrically-driven steering column apparatus according to claim 1, wherein
    said steering column is capable of telescopic position adjustment; and
    said power transmission mechanism transmits driving force of said electric motor to said steering column as a telescopic motion driving force for said steering column.

6. An electrically-driven steering column apparatus according to claim 4, wherein
    said tilt pivot is disposed at a front portion of said steering column, and
    said power transmission mechanism is disposed rearwardly of said tilt pivot.

7. An electrically-driven steering column apparatus according to claim 1, wherein
    the cylindrical joint element and the sleeve are substantially coaxial.

8. An electrically-driven steering column apparatus comprising:
    a steering shaft having a rear end to which a steering wheel is attached;
    a steering column rotatably holding said steering shaft and adapted for adjusting a tilt position of said steering wheel about a tilt pivot of a vehicle body-side member;
    an electric motor which causes a tilt position adjusting motion of said steering column; and
    a power transmission mechanism which transmits driving force of said electric motor to said steering column as a tilt position adjusting motion driving force,
    wherein said power transmission mechanism includes a feed screw shaft rotatably supported at both axial ends thereof to said steering column and being rotated by said electric motor, a slider thread-engaged with said feed screw shaft to be moved along said feed screw shaft by rotation of said feed screw shaft, and a joint including a spherical joint element fixedly connected to one of said slider and said vehicle body-side member, a cylindrical joint element fixedly connected to the other of said slider and said vehicle body-side member, and a sleeve made of synthetic resin material disposed between said spherical joint element and said cylindrical joint element, an inner peripheral surface of said sleeve being spherically concave and rotatably supporting said spherical joint element, an outer peripheral surface of said sleeve being supported by an inner peripheral surface of said cylindrical joint element, and the movement of said slider being transmitted to said steering column as the tilt position adjusting motion about the tilt pivot through said joint.

9. An electrically-driven steering column apparatus according to claim 8, wherein
    said sleeve is formed with an axial slit.

10. An electrically-driven steering column apparatus according to claim 8, wherein
    said tilt pivot is disposed at a front portion of said steering column, and
    said power transmission mechanism is disposed rearwardly of said tilt pivot.

11. An electrically-driven steering column apparatus according to claim 8, wherein said sleeve is slidable in said cylindrical joint element.

12. An electrically-driven steering column apparatus comprising:
    a steering shaft having a rear end to which a steering wheel is attached;
    a steering column rotatably holding said steering shaft and having an outer column and an inner column that is capable of making a telescopic movement relative to said outer column for adjusting a telescopic position of said steering wheel;

an electric motor which causes a telescopic position adjusting motion of said steering column; and a power transmission mechanism which transmits driving force of said electric motor to said steering column as a telescopic position adjusting motion driving force, wherein said power transmission mechanism includes a feed screw shaft elongated along said steering column and rotatably supported at both axial ends thereof to said outer column and being rotated by said electric motor, a slider thread-engaged with said feed screw shaft to be moved along said feed screw shaft by rotation of said feed screw shaft, and a joint including a spherical joint element fixedly connected to one of said slider and said inner column member, a cylindrical joint element fixedly connected to the other of said slider and said inner column member, and a sleeve made of synthetic resin material disposed between said spherical joint element and said cylindrical joint element, which an inner peripheral surface of said sleeve being spherically concave and rotatably supporting said spherical joint element, an outer peripheral surface of said sleeve being supported by an inner peripheral surface of said cylindrical joint element, and the movement of said slider being transmitted to said inner column member through said joint such that said inner column can make said telescopic movement.

13. An electrically-driven steering column apparatus according to claim 12, wherein said sleeve is formed with an axial slit.

14. An electrically-driven steering column apparatus according to claim 12, wherein said sleeve is slidable in said cylindrical joint element.

15. An electrically-driven steering column apparatus comprising:

a steering shaft having a rear end to which a steering wheel is attached;

a steering column rotatably holding said steering shaft and adapted for adjusting a position of said steering wheel;

an electric motor which causes a position adjusting motion of said steering column; and a power transmission mechanism which transmits driving force of said electric motor to said steering column as a position adjusting motion driving force, wherein said power transmission mechanism includes a feed screw shaft being rotated by a shaft of said electric motor, said electric motor being oriented such that said shaft of said electric motor has a rotation axis transverse to an axis of said feed screw shaft, and wherein said power transmission mechanism further includes a slider thread-engaged with said feed screw shaft to be moved along said feed screw shaft by rotation of said feed screw shaft, and a joint disposed laterally from said rotation axis of said feed screw shaft, said joint including a cylindrical joint element connected to one of said slider and a vehicle body-side member, and a spherical joint element received in said cylindrical joint element and connected to the other of said slider and said vehicle body-side member.

16. An electrically-driven steering column apparatus according to claim 15, wherein a sleeve is received in said cylindrical joint element and dispose between said spherical joint element and said cylindrical joint element, an inner peripheral surface of said sleeve being spherically concave and rotatably supporting said spherical joint element, and an outer peripheral surface of said sleeve being supported by an inner peripheral surface of said cylindrical joint element.

17. An electrically-driven steering column apparatus according to claim 15, wherein said cylindrical joint element and said sleeve are substantially coaxial.

18. An electrically-driven steering column apparatus according to claim 15, wherein said cylindrical joint element is fixedly connected to said one of said slider and said vehicle body-side member, and said spherical joint element is fixedly connected to said other of said slider and said vehicle body-side member.

* * * * *